(12) United States Patent
Boucher et al.

(10) Patent No.: US 6,963,861 B1
(45) Date of Patent: Nov. 8, 2005

(54) METHOD AND SYSTEM FOR RESOLUTION OF CARRIER SPECIFIC DATA UTILIZING A GENERIC DATA MODEL

(75) Inventors: Glen A. Boucher, Ansonia, CT (US); Brian D. Flesser, Norwalk, CT (US); Christopher S. Kallas, Monroe, CT (US); Edward M. Rauh, West Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/411,125

(22) Filed: Oct. 4, 1999

(51) Int. Cl.[7] .............................................. G07B 17/00
(52) U.S. Cl. ..................... 705/400; 401/402; 401/409; 401/411; 401/414; 401/416; 401/417; 401/418
(58) Field of Search ............................. 134/110; 206/3, 206/319, 438, 386, 497, 523, 563, 585, 806, 206/320, 363, 370; 221/34; 222/83.5; 261/26; 426/108; 705/26; 52/143; 53/250, 390, 447, 53/449, 172; 99/323.1

(56) References Cited

U.S. PATENT DOCUMENTS

| | | | |
|---|---|---|---|
| 4,832,204 A | 5/1989 | Handy et al. ................. 209/3.3 |
| 5,038,283 A | 8/1991 | Caveney ..................... 364/403 |
| 5,117,096 A | 5/1992 | Bauer et al. ................. 235/375 |
| 5,262,939 A | 11/1993 | Vanpoucke .................. 364/401 |
| 5,313,052 A | 5/1994 | Watanabe et al. ............ 235/375 |
| 5,533,179 A * | 7/1996 | Kucukcakar et al. ........... 713/2 |
| 5,631,827 A * | 5/1997 | Nicholls et al. ............ 700/104 |
| 5,635,694 A | 6/1997 | Tuhro ......................... 235/375 |
| 5,712,789 A | 1/1998 | Radican .................. 364/478.14 |
| 5,778,348 A * | 7/1998 | Manduley et al. ........... 705/409 |
| 5,787,400 A | 7/1998 | Weber ........................... 705/1 |
| 5,812,991 A * | 9/1998 | Kara ........................... 705/410 |
| 5,852,809 A | 12/1998 | Abel et al. ..................... 705/26 |
| 5,869,819 A | 2/1999 | Knowles et al. ............. 235/375 |

(Continued)

OTHER PUBLICATIONS

Netscape and FDX Unveil Plans for Next Generation Internet Package Delivery Center, Apr. 7, 1999, FedEx Corporation Press Release.*

*Primary Examiner*—Hyung S. Sough
*Assistant Examiner*—Debra Charles
(74) *Attorney, Agent, or Firm*—Brian A. Lemm; Angelo N. Chaclas (57) ABSTRACT

A system and method of retrieving shipment data uses destination information, as well as the carrier and level of service data models to retrieve the appropriate shipment data which complies with the selected parameters. The delivery commitment systems returns information concerning the number of days, the delivery, the latest time of delivery, whether the delivery is guaranteed based upon selected parameters concerning the origin and destination of the package. Carrier specific data can be stored in a common, carrier-independent form including an origin map, (optional) one or more destination maps, a service token map, a zone token map, and a delivery commitment matrix. Origins and destinations can be defined by five-digit ZIP codes and the service can be identified by a TokenID. Each origin can be mapped to a destination within the destination map, where each destination in the destination map is resolved to a service level index. The desired class of service, as identified by a carrier's TokenID, is resolved in a look-up table to a service column index. The service level index and the service column index are then used as indices into a delivery commitment matrix so as to provide delivery commitment data. Zone mapping is also supported to obtain such delivery commitment data.

10 Claims, 12 Drawing Sheets

U.S. PATENT DOCUMENTS

| | | | |
|---|---|---|---|
| 5,910,896 A | 6/1999 | Hahn-Carlson | 364/479.01 |
| 6,035,291 A * | 3/2000 | Thiel | 705/408 |
| 6,105,018 A * | 8/2000 | Demers et al. | 707/2 |
| 6,243,613 B1 * | 6/2001 | Desiraju et al. | 705/28 |
| 6,510,997 B1 * | 1/2003 | Wilz, Sr. et al. | 235/472.01 |

* cited by examiner

| | | |
|---|---|---|
| HEADER | REQUIRED | SIZE=59 BYTES |
| ORIGIN MAP | REQUIRED | SIZE=100,000 BYTES |
| DESTINATION MAP 1 | REQUIRED | SIZE=100,000 BYTES |
| ... | | |
| DESTINATION MAP N | OPTIONAL | SIZE=100,000 BYTES |
| TOKEN MAP | REQUIRED | SIZE=DYNAMIC |
| ZONE MAP | OPTIONAL | SIZE=DYNAMIC |
| COMMITMENT MATRIX | REQUIRED | SIZE=DYNAMIC |

METHOD AND SYSTEM FOR RESOLUTION OF CARRIER SPECIFIC DATA UTILIZING A GENERIC DATA MODEL

CROSS REFERENCE TO RELATED APPLICATION(S)

Reference is made to U.S. application Ser. No. 09/411,092, filed on even date herewith entitled, A METHOD AND SYSTEM FOR ESTABLISHING PARCEL SHIPPING VIA THE INTERNET, assigned to the assignee of this application;

Reference is made to and U.S. application Ser. No. 09/411,524, filed on even date herewith entitled, A METHOD AND SYSTEM FOR MULTI-CARRIER PACKAGE TRACKING, assigned to the assignee of this application. The subject matter of each of these applications is hereby incorporated by reference.

TECHNICAL FIELD

The present invention relates to a shipping system, particularly to such a system in which provides for the selection of a carrier from a plurality of carriers with regard to delivery of a package to a recipient. The invention is directed to such a shipping system in which the Internet is used to communicate to the user as well as to the carrier and is particularly directed to a system and method for maintaining delivery commitment information with regard to each of a plurality of carriers that can be utilized for delivery of a package from a user to a recipient.

BACKGROUND OF THE INVENTION

Shipping systems in which one of a plurality of carriers can be selected are known. The maintaining of delivery commitment information with regard to the shipping system according to the present invention provides for an efficient mechanism for resolving carrier delivery commitments which may vary from carrier to carrier. The particular architecture and methodology provide for unique capabilities of the delivery commitment system.

SUMMARY OF THE INVENTION

The delivery commitment system and method provides for resolution of carrier specific data with regard to delivery of packages by that carrier. A delivery commitment file structure is disclosed which provides a mechanism to resolve the delivery commitments of a particular carrier with regard to delivery of a package based upon the selected origin for the package, the selected destination of the package, as well as the type of shipping service desired by the user, and carrier service level available based upon the desired destination. The delivery commitment system returns information concerning the desired delivery, including number of days to effect delivery, the latest time of delivery for the target date, whether the latest time of delivery is guaranteed by the carrier, as well as the availability of delivery on special days such as Saturday delivery, the time associated with such special delivery and whether such special delivery time is guaranteed.

The delivery commitment system can be accessed by multiple processes on a simultaneous basis without requiring mutual exclusion protect or serialization of access. The preferred embodiment of the delivery commitment subsystem is re-entrant and fully interruptable, thereby making it the delivery commitment system suitable in a client/server environment such as Internet-based shipment systems as that disclosed in the co-pending applications for A Method and System for Establishing Parcel Shipping Via the Internet; and A Method and System for Multi-Carrier Package Tracking, filed on the same date hereof, and all owned by the same assignee.

BRIEF DESCRIPTION OF THE DRAWINGS

For a fuller understanding of the nature and objects of the present invention, reference is made to the following detailed description taken in conjunction with the following drawings in which:

FIG. 7 is a diagram similar to FIG. 6 showing the location of maps forming the delivery commitment file structure.

DETAILED DESCRIPTION

Figure 1:
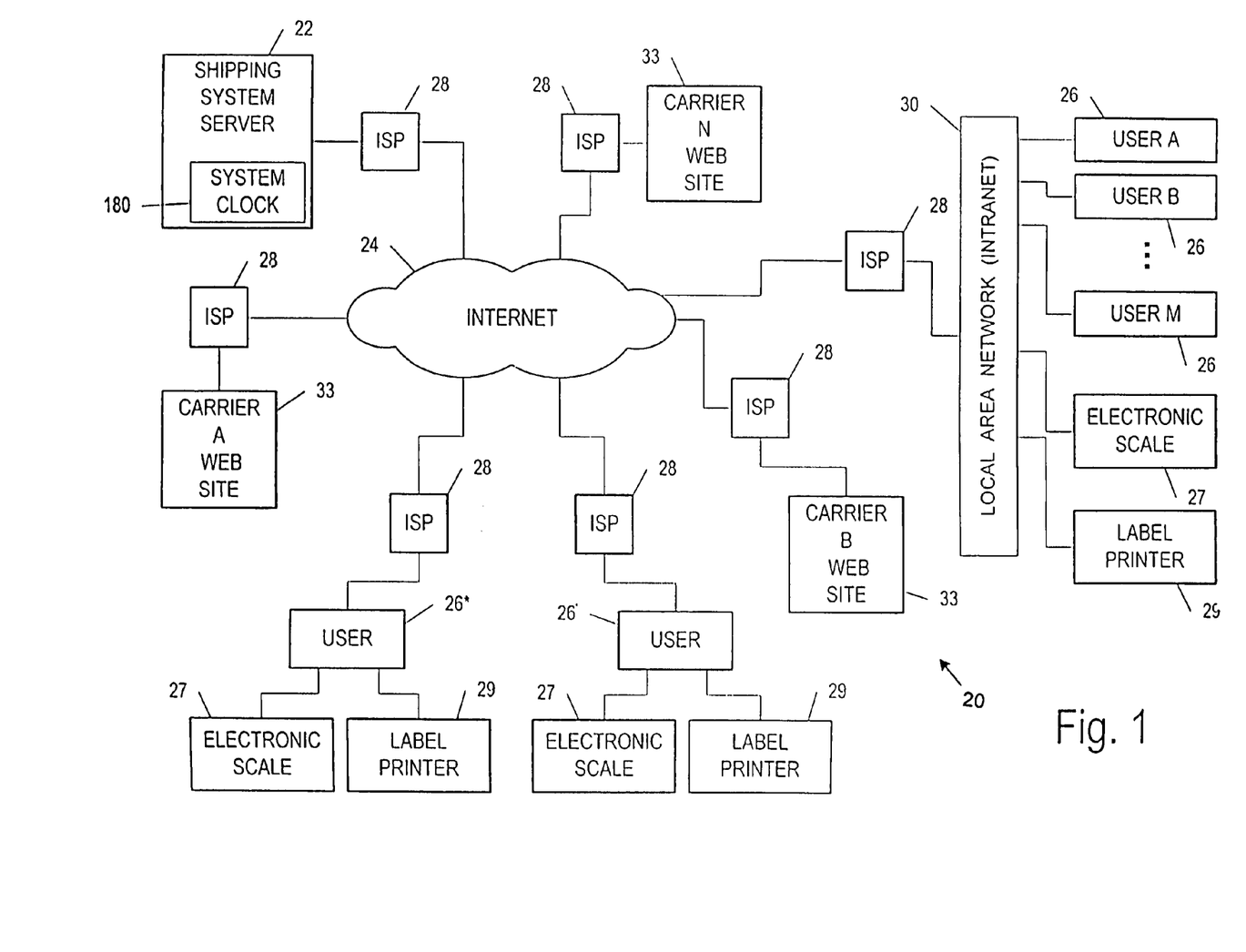
FIG. 1 is a block diagram illustrating a shipping system in which the delivery commitment system according to the present invention can be used to form a part thereof.
Figure 3:
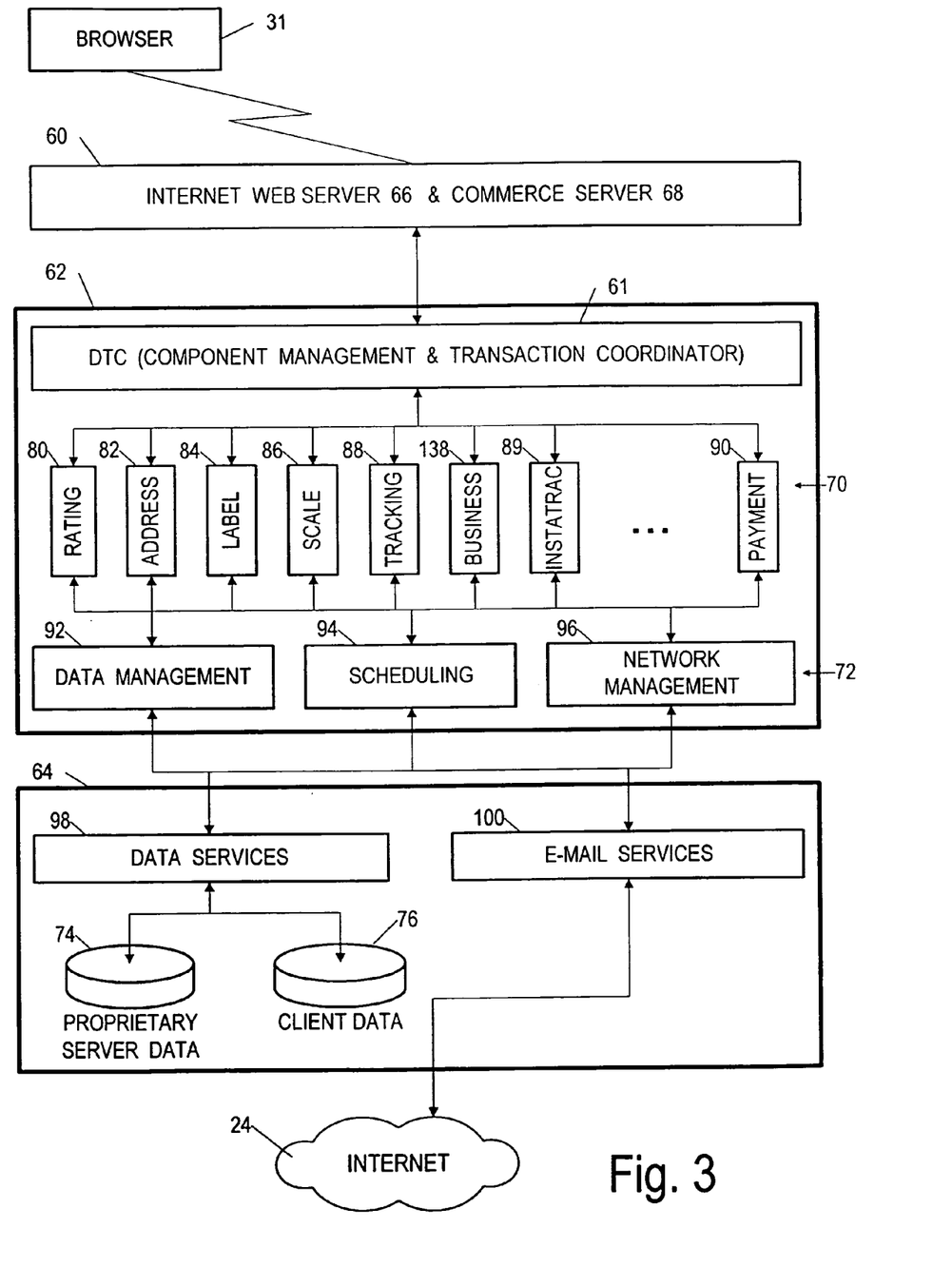
FIG. 3 is a detailed block diagram of the architecture for the shipping system shown in FIG. 1.

The delivery commitment system and method of the present invention forms part of an overall shipping system and method as described in copending applications entitled Ser. No. 09/411,092 entitled, A Method and System for Establishing Parcel Shipping Via the Internet; and U.S. application Ser. No. 09/411,524 entitled, A Method and System for Multi-Carrier Package Tracking, filed on the same date hereof and all owned by the present assignee and all incorporated by reference. As best seen in FIG. 1, this overall shipping system 20 comprises a shipping system server 22 and one or more users (senders) 26 which interact with the server by means of the Internet 24, typically through connection through an Internet Service Provider 28. Although a plurality of users at a single location are shown which are interconnected by a local area network (LAN) 30, the system also allows other users (e.g. user 26* and 26') to access the system. The shipping system server architecture is shown in FIG. 3. As there seen, it comprises a client tier 60 for providing web based services, an application tier 62 for providing specific application functions to the user, and a groupware services tier 64 for storing proprietary data 74 and client data 76 and for providing E-mail services 100. The application tier includes application software component 80, 82, 84, 86, 88, 90 and 138 for performing various tasks. The delivery commitment function generally forms part of the rating component 80.

Figure 2:
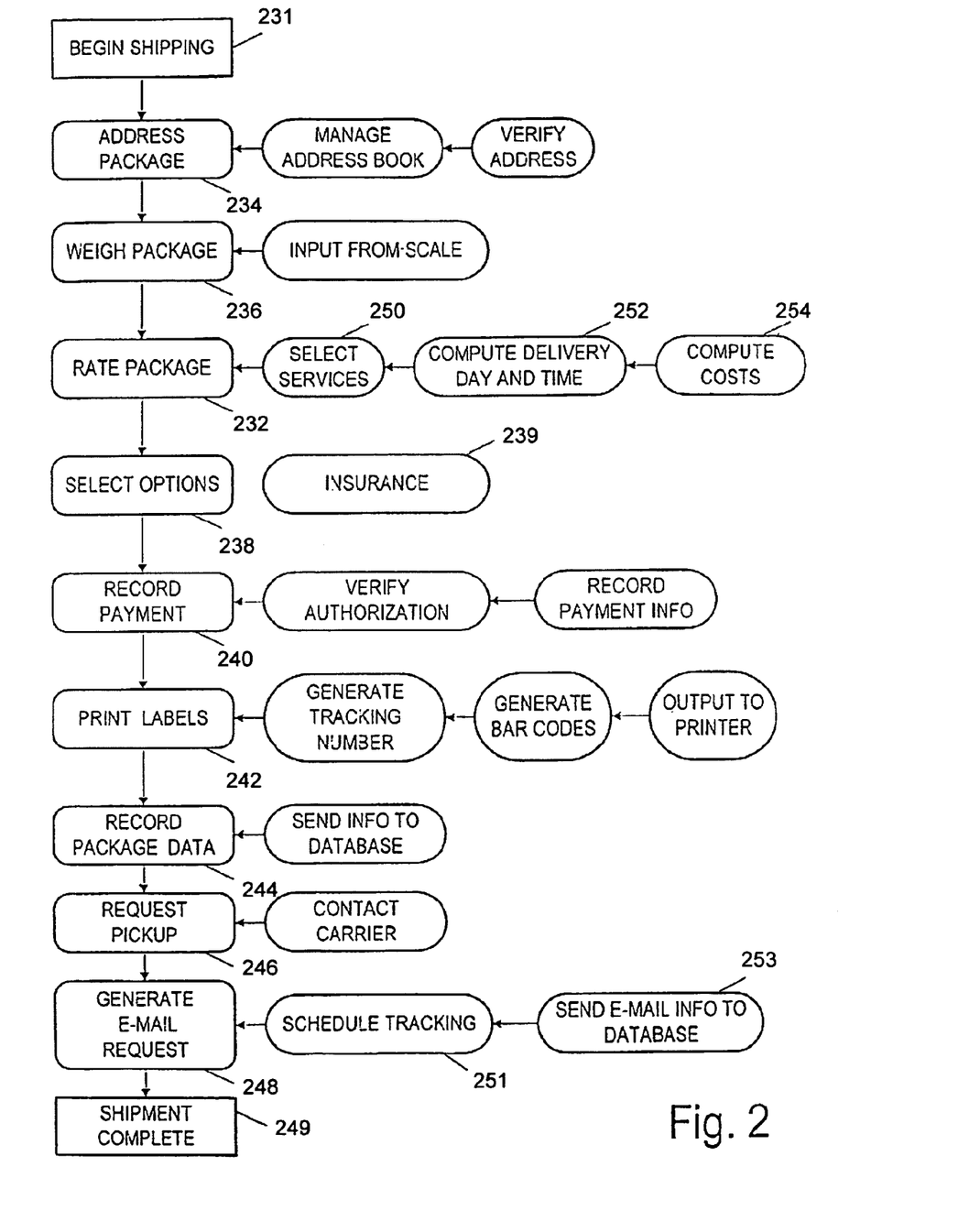
FIG. 2 is a flow chart of a typical sequence of shipping steps associated with the shipping system shown in FIG. 1.

The typical steps for shipping a package are shown in FIG. 2. Steps 231, 232, 234, 236, 238, 239, 240, 242, 244, 246, 248, 249, 250, 251, 252, 253, and 254 are typically performed to ship a package, although some steps may not be performed depending upon the needs and equipment of the user (e.g. the weigh package step would not be performed if the user did not have an interconnected electronic scale 27—see FIG. 1).

The delivery commitment system according to the present invention is the mechanism by which the shipping system server 22 determines delivery commitment information for sending a package by a particular carrier.

A carrier typically defines and publishes delivery commitment information for particular services associated with each destination area serviced by the carrier. Such a destination area in the United States is typically defined by the associated 5-digit ZIP code. Thus for example, for United Parcel Service (UPS), Next Day Air Service may deliver to ZIP Code 49080 by 10:30 AM of the following day for business days Monday through Friday, but for a destination in ZIP Code 49612, deliver next day only has a commitment of the end of day.

Figure 4:
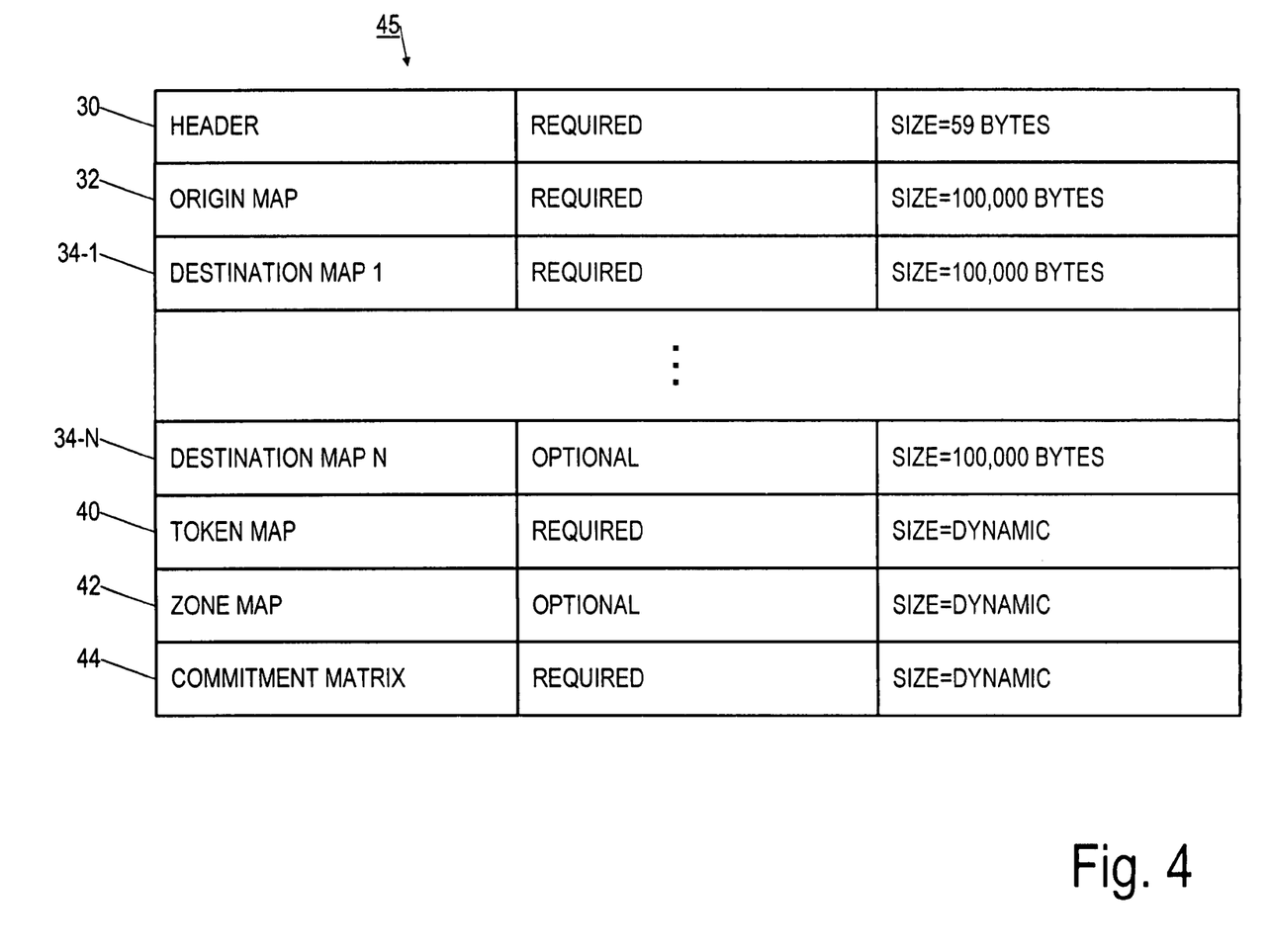
FIG. 4 is a diagram showing the delivery commitment file structure for a delivery commitment system according to the present invention.

To support this type of functionality, the present invention defines a Delivery Commitment File structure 45. The high-level structure of the Delivery Commitment File is shown in FIG. 4. As there seen, the file structure includes a header 30, an origin map 32 (optional), a destination map 34-1, optional additional destination maps 34-N, a token map 40, a zone map 42 and a delivery commitment matrix 44. Such a file format typically has the extension ".DEL", wherein the rating component 80 of the shipping system server 22 uses the carrier symbol and appends the .DEL to form the overall file name for the delivery commitment file (such as UPS.DEL).

Figure 5A:
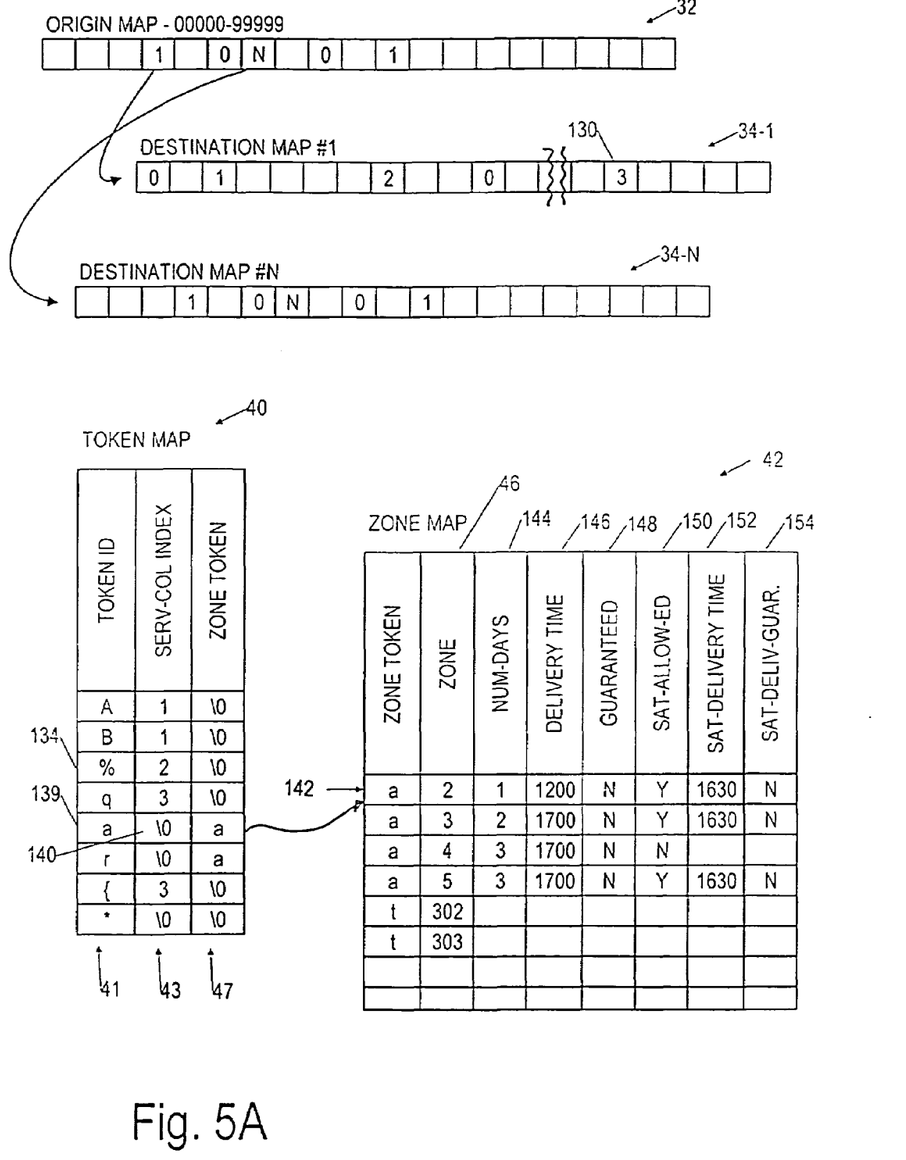
FIGS. 5A–5B are detailed diagrams showing the delivery commitment file structure and its inter-relationship for the delivery commitment system according to the present invention.
Figure 5B:
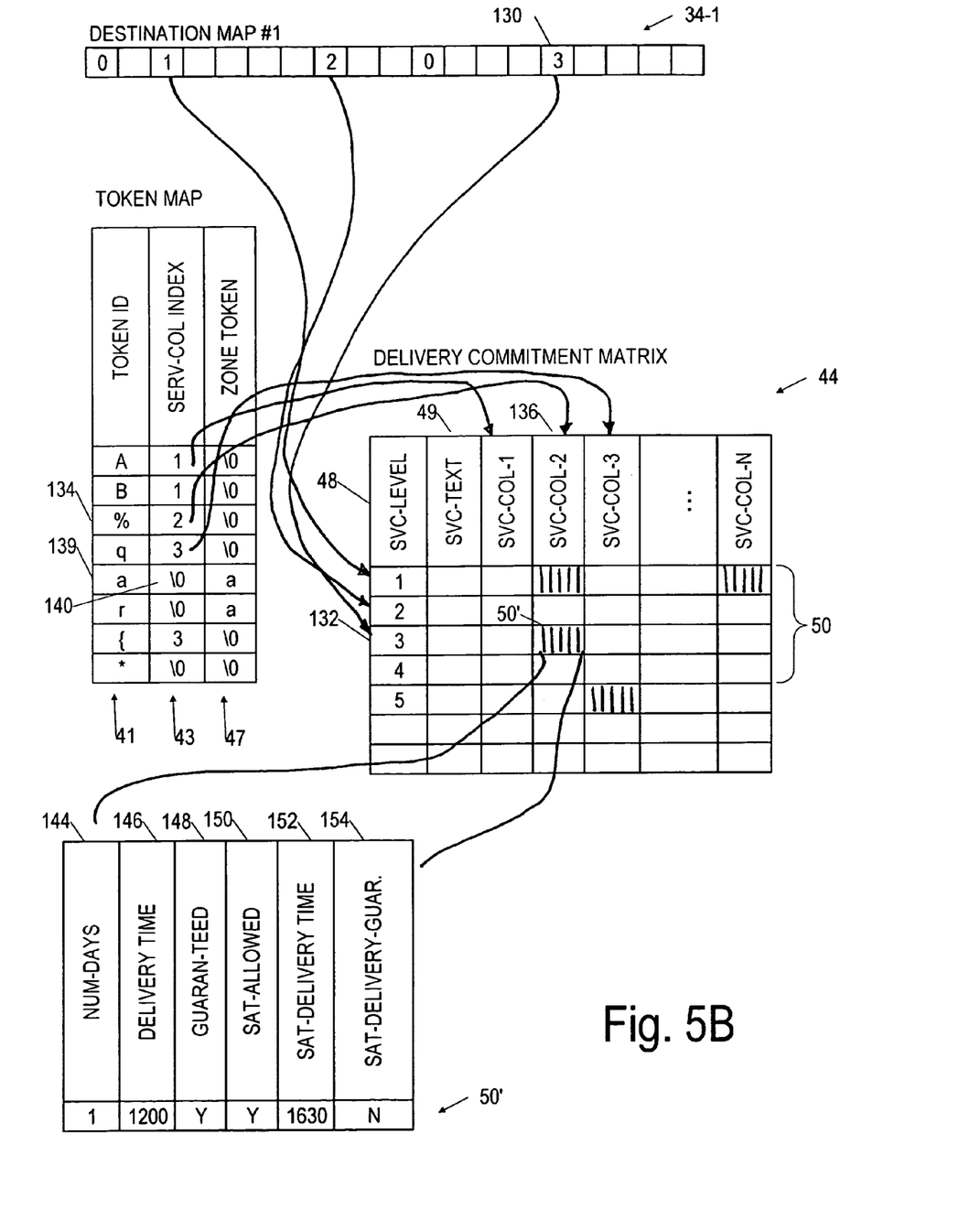

FIGS. 5A and 5B illustrate a detailed structural diagram of the Delivery Commitment File Structure. FIG. 5A shows the CFS with the use of a Zone Map 42 and FIG. 5B shows the DCFS with a Delivery Commitment Matrix 44. The actual data is represented as streams of information. This diagram excludes the header information which as seen in FIG. 4 typically has a size of 59 bytes.

As seen in FIG. 5A, the origin map 32 comprises 100,000 bytes of data, wherein each byte location is representative of a 5-digit postal code ranging from 00000 through 99999, with each byte having a value corresponding to one of plurality of Destination Maps 34-1 through 34-N. This origin map is only needed if the specific carrier supports origin dependent delivery. Thus for example, a particular carrier may specify unique information for specific ZIP Codes east of the Mississippi River and such could be determined by the appropriate ZIP Codes in the origin map. The origin map information then contains the identity of the specific Destination Map to use. If the carrier does not support origin dependent delivery, then the Origin Map is not needed or contains the same Destination Map identity for each byte (e.g. 1) Since each byte contains 256 values, it is selected that a value of zero signifies an illegal origin with the other 255 legal values specifying a particular destination map to use.

Each Destination Map 34-1 through 34-N also is a stream of 100,000 bytes of data where each byte location is representative of a 5-digital postal code ranging from 00000 to 99999. Typically a carrier categorizes a destination area into service levels. For example, Airborne Express may tag destination ZIP Codes as Bold Red, Bold Black or Light Black, each representing a different level of service for packages sent to that destination. Each Destination Map basically contains a number for each ZIP Code where the number represents the service level supported by that carrier. Multiple destination maps exist if a carrier supports origin dependent delivery commitment information.

Again, since each byte represents 256 possible values, the value zero is used to signify an illegal service level with the remaining 255 possible values of each byte specify a particular service level to use within the commitment matrix 44. In general, a carrier will only have a few different service levels (such as five), as shown by the Delivery Commitment Matrix 44.

The Token Map 40 represents data that provides the ability to group services. For example, services with regard to a particular carrier can be grouped if delivery commitment information for various services of that carrier are identical. Thus for example, UPS Next Day Air-Letter service and Next Day Air-Package service may have identical delivery commitments and therefore can be grouped by use of a single TokenID 41. As best seen in FIGS. 5A and 5B, the token map 40 has a TokenID field, as this field is defined within the rating component 80. Given a TokenID value, it is then possible to determine the Service Column Index (Serv-Col Index) value as set forth in column 43. As seen in FIG. 5A, the value in the ServCol Index defines the specific column within the Delivery Commitment Matrix 44. If the ServCol Index value 43 and Zone Token value (discussed below) have the value of \0, then delivery commitment information is not available for that destination/carrier and service. The situation where a TokenID cannot be found typically occurs when a service is added by a carrier and the shipping service has not updated the corresponding Delivery Commitment (DEL) file. If the carrier cannot provide delivery information in time for a rate change, the DEL file may not receive an update.

EXAMPLE

The following example shows how the Delivery Commitment file structure is used to obtain delivery commitment information for the intended delivery of a package. In the situation where a particular carrier does not have origin dependent delivery commitment—that is all the delivery commitments for a given destination are the same regardless of the origin of the package—then the only information necessary for determining the delivery commitment by that carrier is the determination of the destination area and the type of service that the user wants with regard to delivering the package to the destination. This latter information is used to select the particular TokenID to use in the Token Map while the particular destination area is used to select a particular value for the corresponding ZIP code in the Destination Map. Thus, for instance, if the destination ZIP code is 08021, then the value in the Destination Map for location 8021 out of the 100,000 bytes in the Destination Map is retrieved as shown by destination area 130. As seen in the Destination Map for the 08021 ZIP code, it is the number 3 which would therefore map to the number 3 service level in the delivery commitment matrix (see reference column 132). This corresponds to the service level that that particular carrier will commit for that destination.

To determine the specific delivery commitment information, the delivery commitment matrix must have the specific service column determined. To do this, the requested level of service by the user is used to select the particular TokenID which matches that desired level of service for that carrier.

Thus, for instance, if the level of service corresponds to TokenID "%", reference 134, this line of the Destination Map is used to determine that the service column index value is "2" and therefore the service SERV-COL-2 column 136 of the delivery commitment matrix 42 is used so as to access cell 50' from the delivery commitment matrix.

To determine the specific delivery commitment information, the delivery commitment matrix must have the specific service column determined. To do this, the requested level of service by the user is used to select the particular TokenID which matches that desired level of service for that carrier. Thus, for instance, if the level of service corresponds to TokenID "%", reference 134, this line of the Destination Map is used to determine that the service column index value is "2" and therefore the service SERV-COL-2 column 136 of the delivery commitment matrix 44 is used so as to access cell 50' from the delivery commitment matrix.

If a particular requested service level does not have a carrier specified value service column index value associated therewith, such as for a TokenID value "a" (see reference numeral 139), then the service column index value is specified as "/0" (see reference numeral 140) and therefore in order to determine the delivery commitment use of zone information is required if such information is provided by that carrier. As seen in FIG. 5A, the zone token values 47 are then used to access a particular row in the zone map 42 and this value when coupled with a received zone 46 (that is a value typically provided by the carrier which is usually based upon the origin and destination) allows the user to determine the delivery commitment information from the zone map 42. Thus, for instance, if the level of service "a" is desired by the user (see reference numeral 139), and if the zone for delivery of the package from the origin to the destination is zone 2, then the information in row 142 is used to obtain the delivery commitment cell comprising the same fields as for the delivery commitment matrix; that is, the number of days field 144, the delivery time field 146, the guaranteed field 148, the Saturday delivery allowed field 150, the Saturday delivery time field 152, and the Saturday delivery guarantee field 154. In the example given in FIG. 5B for cell 50', the values for these six fields is respectively one day, noon (12:00), yes guaranteed delivery, Saturday delivery allowed, Saturday delivery time of 4:30 P.M. (16:30) and Saturday delivery not guaranteed.

It should be noted that if the zone token value is zero (\0) for a row in the token map for which the serv-column index value is also zero (\0), then this represents the situation where no delivery commitment data is available from the carrier for that intended delivery scenario (see for example now 143).

Thus the zone map 42 is used to support zone-based delivery commitment information. Depending upon the carrier, information concerning its delivery commitments can be broken out, depending upon the destination of the package. The key into the Zone Map 42 is the Zone Token value 47 as well as the zone information (column 46). The zone value in zone column 46 is determined by the origin and destination of the package. Thus, if the package is to be sent from the 06611 ZIP code to the 08021 ZIP code, the zone value might be 2. A NULL zone value is possible and occurs if a delivery estimate is made for a non-zoned service.

The Delivery Commitment Matrix 44 contains actual delivery commitment information for each cell 50. The delivery commitment information for each cell 50 is set forth in Table 1:

TABLE 1

| | Description |
|---|---|
| Num Days 144 | The carrier defined delivery day. Typically 1, 2 or 3 days. Permissible values range from 0 to 255, where 0 means same day and 255 means that service is not provided at this time. |
| Delivery Time 146 | This information identifies the carrier delivery time in military time format (0000 to 2400). During data generation, assumptions may be made, for example, that a carrier may specify delivery time as "End of Day" which may translate into 1700 hours. |
| Guaranteed 148 | This specifies that the delivery day/time is guaranteed by the carrier. This is a Boolean field and thus has a value of Y or N. |
| Sat Allowed 150 | This value specifies if a Saturday delivery is allowed. It is a bouillon value and has the values of Y or N. |
| SatDeliveryTime 152 | This value is the time for delivery if Saturday delivery is allowed. |
| SatDelivGuarantee 154 | This value specifies if the Saturday delivery is guaranteed. It is a Boolean value (Y or N). |

As seen in FIG. 4, the delivery commitment file format has a header 30. The header contains the following information as set forth in Table 2.

TABLE 2

| | Description |
|---|---|
| Signature | This field contains the text "DeliveryInfo$^{bbb/0}$". This text is inserted to identify the file in human readable form. CHAR(16) - sixteen characters long w/zero padding |
| CarrierSymbol | This field contains the carrier symbol as it appears in the rating component 80. Currently the values are UPS, USPS, FEDEX, DHL, ARIB, and RPS. This field is inserted to identify the relevant carrier in human readable form. CHAR(9). |
| NumDestMaps | This field specifies the number of destination maps and is in byte format. Size equals 1 byte. |
| EffectiveDate | This field specifies the effective date of the carrier data in format mm/dd/yyyy. CHAR(11). |
| OffsetToOriginMap | This field provides a pointer to the beginning of the origin map data 32, This pointer points beyond the size of the header. Size equals 4 bytes. |
| OffsetToTokenMap | Provides a pointer to the beginning of the TokenMap 40 data. This pointer is formed by adding the following: SizeOfHeader + SizeOfOriginMap(100k) + (SizeOfDestination Map{100k}) * (NumberOfDestMap). Size equals 4 bytes |
| OffsetToZoneMap | Provides a pointer to the beginning of the ZoneMap 42 data. This pointer is formed by adding the following: SizeOfHeader + SizeOfOriginMap (100k) + (SizeOfDestination < Map{100k}) * (NumberOfDestMap) + SizeOfTokenMap. Size equals 4 bytes |
| OffsetToCommit-Matrix | Provides a pointer to the beginning of the Delivery Commitment Matrix 44. This pointer is formed by adding the following: SizeOfHeader + SizeOfOriginMap(100k) + (SizeOfDestinationMap{100k}) * (NumberOfDestMap) + SizeOfTokenMap + SizeOfZoneMap. Size equals 4 bytes |
| NumSvcClasses | Identifies the number of class mappings that are supported. This also specifies the number of columns in the commitment matrix. Size equals 1 byte |
| NumSvcLelvels | Identifies the number of service levels supported. This value also specifies the number of rows in the Delivery Commitment Matrix 44. Size equals 1 byte |
| NumTokens | Specifies the number of TokenID's within the TokenMap 40 file. Size equals 1 byte |

TABLE 2-continued

| | Description |
|---|---|
| NumZoneMapRecords | Specifies the number of rows in the ZoneMap 42 file. Any NULL Zones are included in the count. Size equals 1 byte |
| SizeOfSvcLevelText | Specifies the size of the service level text 49. If necessary, it can provide text associated with service levels. For example "Bold Red", "Bold Black", etc. This text is placed in the Svc Text field 49 within the Delivery Commitment Matrix 44. Size equals 1 byte |
| SizeOfClassColumn | Specifies the total size of the actual delivery commitment information. This is comprised of NumDays + Guarantee + DelTime + SatAllowed + SatDelTime + SatGuarantee. Size equals 1 byte |

The "SizeOf.." fields and the "Num.." fields are provided so as to programmatically and dynamically traverse the file for the necessary information.

Further details concerning the delivery commitment file and its fields are presented in Table 3 which is presented in the Backus Naur Form.

TABLE 3

```
DeliveryCommitFile =   {DelivCommitHdr
                        + OriginMap
                        + {DestMap}
                        (DelivCommitHdr.NumDestMaps)
                        + TokenMap
                        + CommitMatrix
                        }
DelivCommitHdr
= {Signature              char[16]  domain
                                    "DeliveryInfo" + CHR(0)
+ CarrierSymbol           char[9]domain restrict to 8 + null
+ NumDesMaps              byte      domain 1 . . . 255
+ EffectiveDate           char[11]  template MM/DD/YYYY +
                                    CHR(0)
+ OffsetToOriginMap       DWORD (4 bytes)
+ OffsetToTokenMap        DWORD (4 bytes)
+ OffsetToZoneMap         DWORD (4 bytes)
+ OffsetToCommitMatrix    DWORD (4 bytes)
+ NumSvcClasses           byte      domain 1 . . . 255
+ NumSvcLevels            byte      domain 1 . . . 255
+ NumTokens               byte      domain 1 . . . 255
+ NumZoneMapRecords       byte      domain 1 . . . 255
+ SizeOfSvcLevelText      byte      domain 0 . . . 255
+ SizeOfClassColumn       byte      domain 12
                        }
Total Bytes = 59
OriginMap               = {DestMapId} (100000)
DestMapId               = {DestinationScale byte}
DestMap                 = {SvcLevelScale} (100000)
SvcLevelScale
        = {Scale    byte    domain
                            0 . . . DelivCommitHdr.NumSvcLevels
                            0 = not served
          }
CommitMatrix =
{SvcLevelDescriptor} (DelivCommitHdr.NumSvcLevels)
SvcLevelDescriptor      byte    domain
                                1 . . . DelivCommitHdr.NumSvc
                                Levels
+ SvcLevelText          char(DelivCommitHdr
                        .SizeOfSvcLevelText
                        ]
+ {ClassColumn} (DelivCommitHdr.NumSvcClasses)
ClassColumn
        = {NumDays byte    domain 0 . . . 255
                            0 = same day
                            255 = service not available
+ DeliveryTime       Char[4]     template military time
                                 "     " if service not available
+ Guarantee          byte        domain Y/N
```

TABLE 3-continued

```
+ SatAllowed         byte            domain Y/N
+ SatDeliveryTime    char[4]template military time
                                     "     " if SatAllowed = 'N'
+ SatDelivGuarantee  byte            domain Y/N
}
Total Bytes = 12 bytes per cell
TokenMap
    = {
        {
        TokenID        byte     domain 1 . . . 255
        + ClassColumn  byte     domain
                                0 . . . DelivCommitHdr.
                                NumSvcClasses
                                0 = not supported
        + ZoneToken byte        domain 1 . . . 255
        }
(DelivCommitHdr.NumTokens)
}
Total Bytes = 3 bytes per record
ZoneMap
    = {
        {
        TokenID        byte     domain 1 . . . 255
        + Zone         char(3)domain 000–zzz
        + (ClassColumn)
        }
(DelivCommitHdr.NumZoneMapRecords)
}
Total Bytes = 1 + 3 + 12 = 16 bytes per record
```

Figure 6:
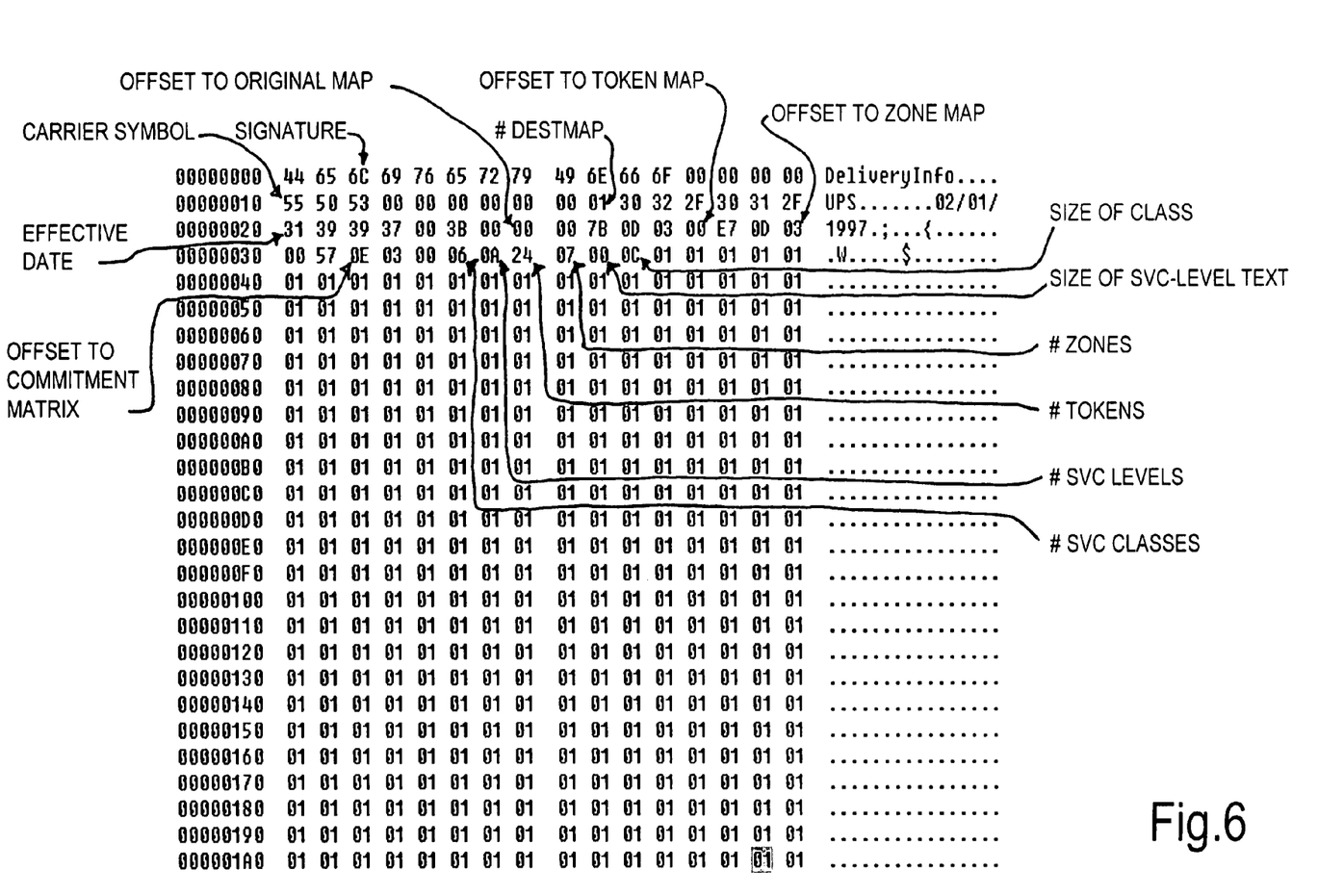
FIG. 6 is a diagram illustrating the hexadecimal data format for the delivery commitment file structure with identification of the location of specific information concerning the delivery commitment file structure.

FIGS. 6 and 7 are examples of delivery commitment file data with indications of the locations of the various fields discussed above as well as the location of the Token Map, Zone Map, and Commitment Matrix.

Delivery Commitment Matrix Cell Determination Flow Chart

Figure 8A:
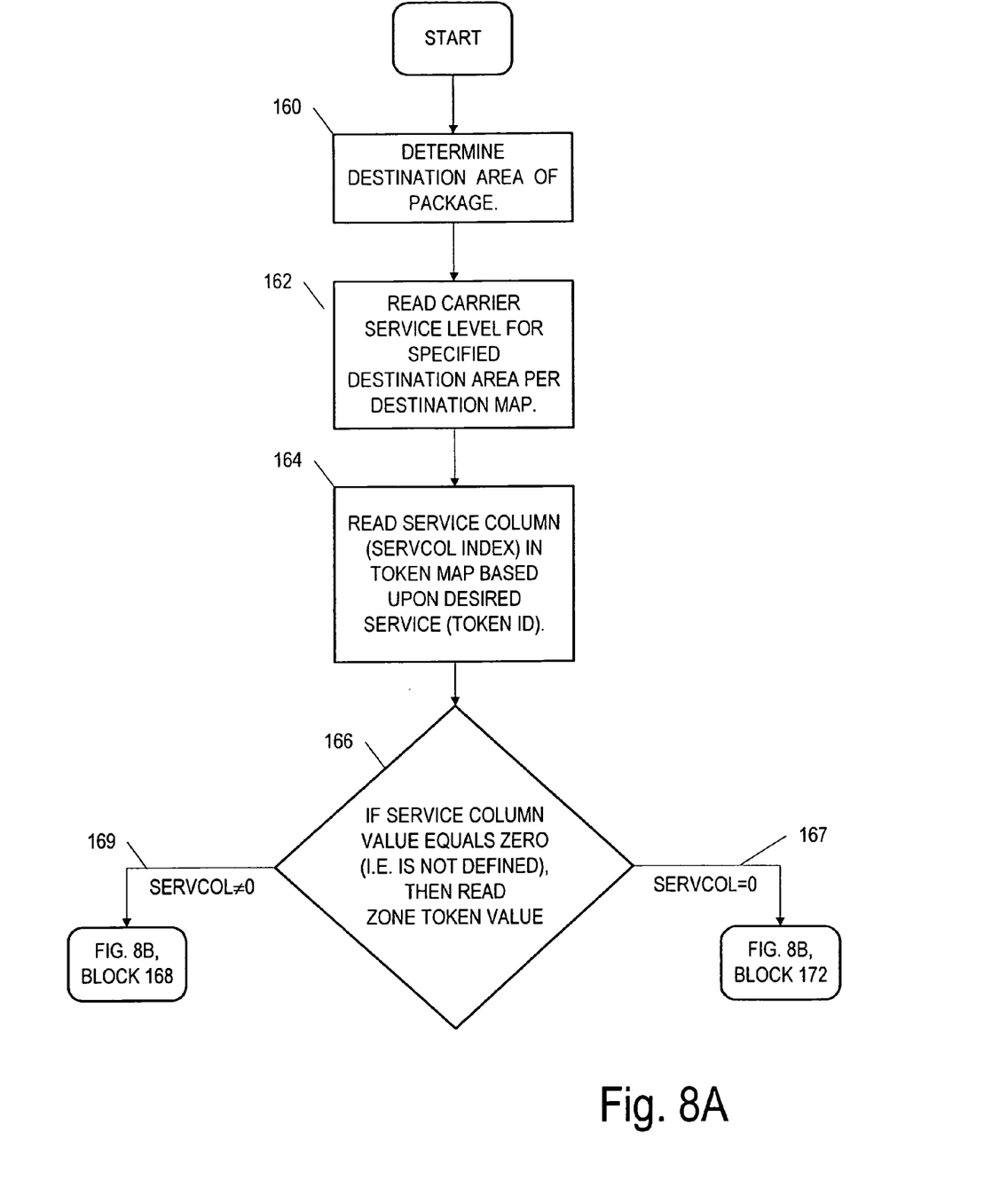
FIGS. 8A–8B are a flow chart for determining the delivery commitment of a carrier.
Figure 8B:
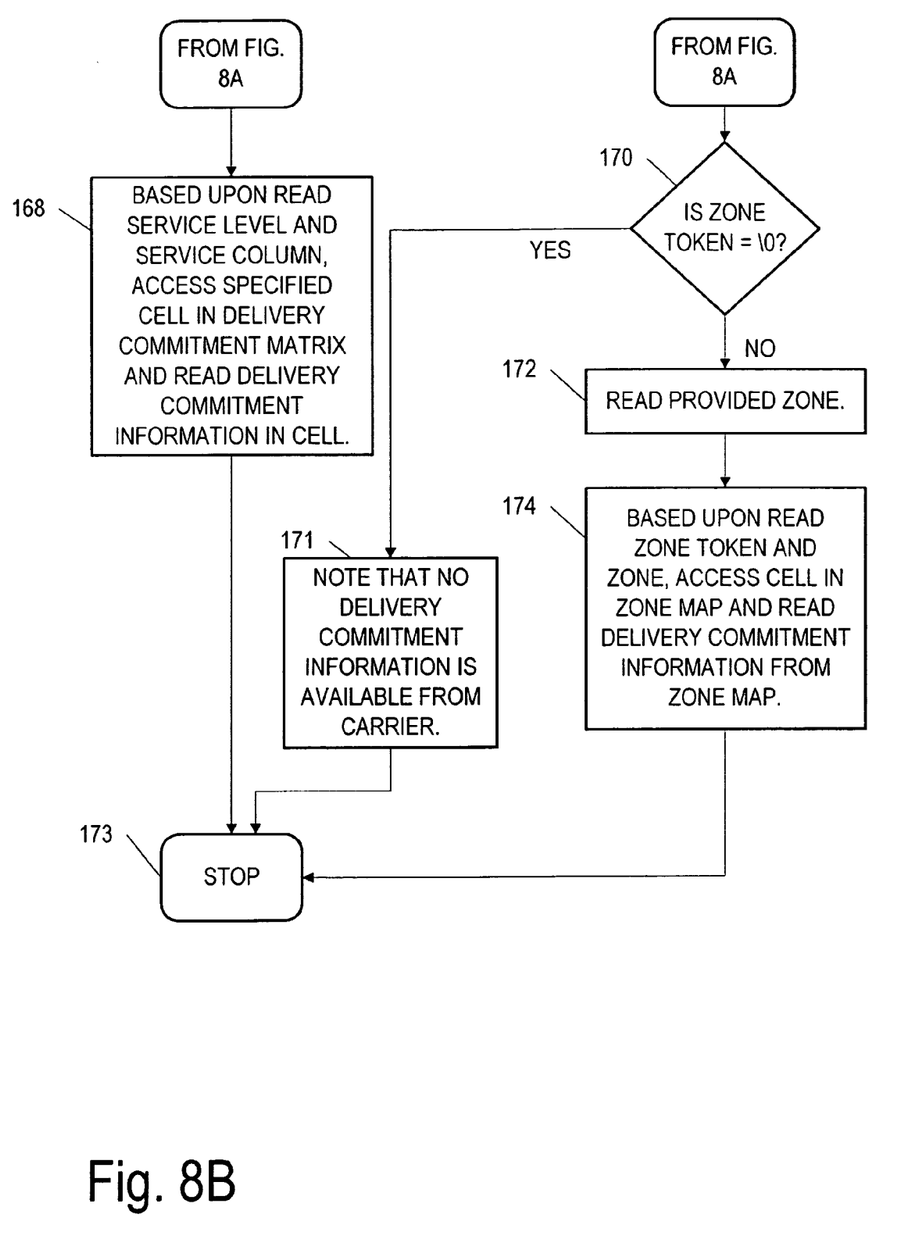

FIGS. 8A–8B represent the overall flow chart for determining delivery commitment information for the delivery of a package to a particular destination by a particular carrier based upon the desired service level for that delivery. First the determination is made of the destination area of the package in step 160. This normally comprises reading the ZIP code of the destination address since in the preferred embodiment of the present invention the destination map comprises a numerical value for each ZIP code.

Next, in step 162, the service level for the specified destination area is determined by reading the corresponding value in the Destination Map. This is the service level which the carrier can provide for that destination regardless of the origin of the package. If the service level varies for that carrier depending upon the origin of the package, then additional destination maps are used with an origin map 32 (see FIG. 5A) then being used to determine which destination map to use. Next, in step 164, the service column index value is determined based upon the desired service as that desired service is presented in the TokenID field 41 (see FIG. 5B). The service column then points to the particular service column within the delivery commitment matrix 44 while the service level determined from the destination map determines which row of the delivery commitment matrix to use. The intersection of these two defines a particular delivery commitment matrix cell such as cell 50' which is then used to retrieve the delivery commitment matrix for that particular delivery. See step 168.

If however the service column index value for a particular TokenID has a zero value (/0), then the zone token value is used in conjunction with a provided zone to determine the delivery commitment matrix cell. This is shown in FIGS. 8A and 8B through decisional step 166 which basically asks if the service column value equals zero such that path 167 is used if the service column value does have a zero value and path 169 is used if the path is not equal to zero.

As seen in FIG. 8B, step 170 is a decisional step that determines if the zone token in the same row of the Token Map 40 is equal to zero (\0). If it is, then the carrier does not have delivery commitment data available (step 171) and the flow stops (step 173). If the zone token has a non-zero value, then the zone is read (step 172). The zone value is typically provided by the carrier and is based upon the origin and destination of the intended shipment of the package. Step 174 then goes on to determine the particular cell within the zone map 42 based upon the zone token and the received zone.

Generic Data Model

Figure 9A:
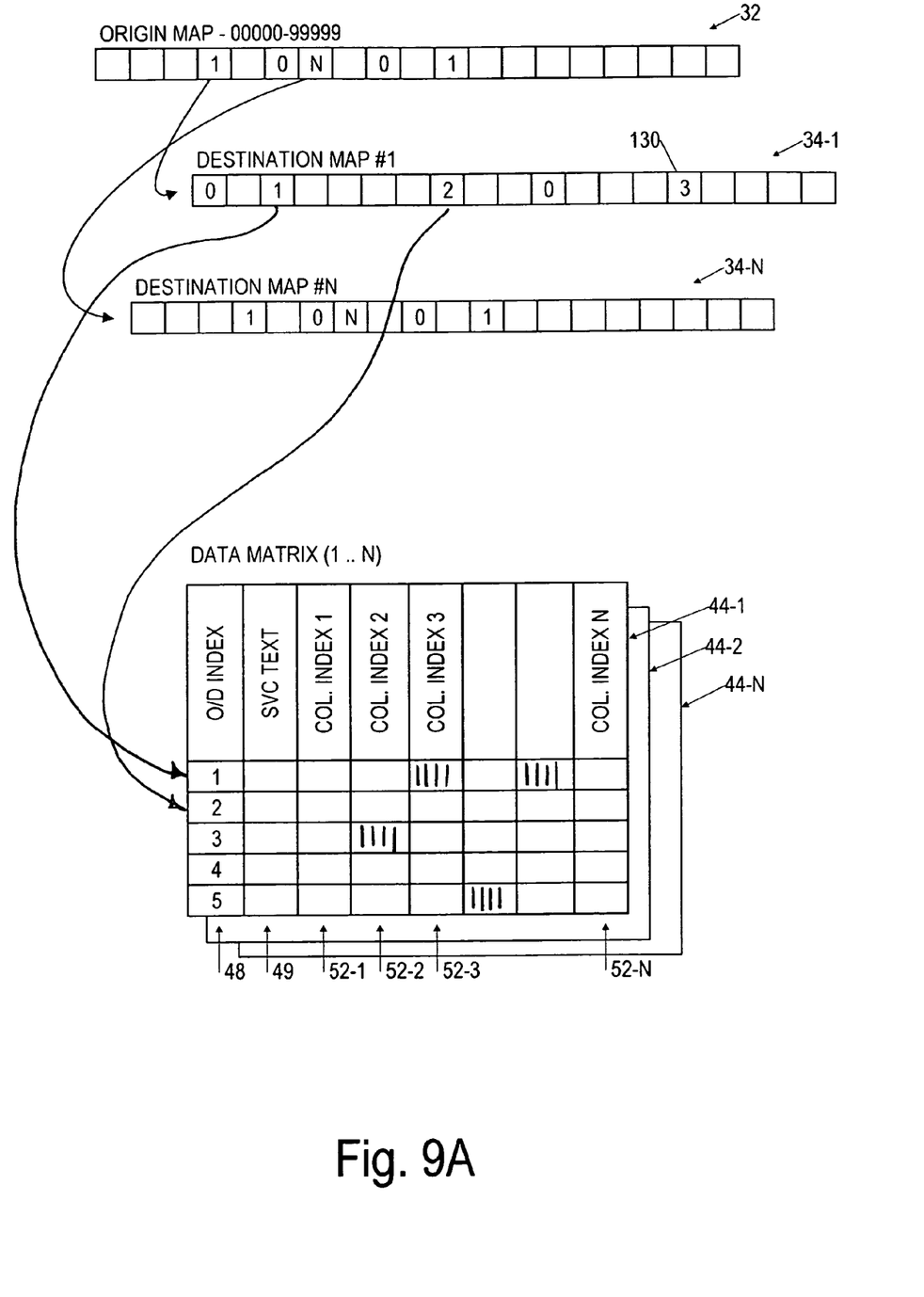
FIGS. 9A–9B are a diagram showing a generic multi-carrier data structure for the delivery commitment system according to the present invention.
Figure 9B:
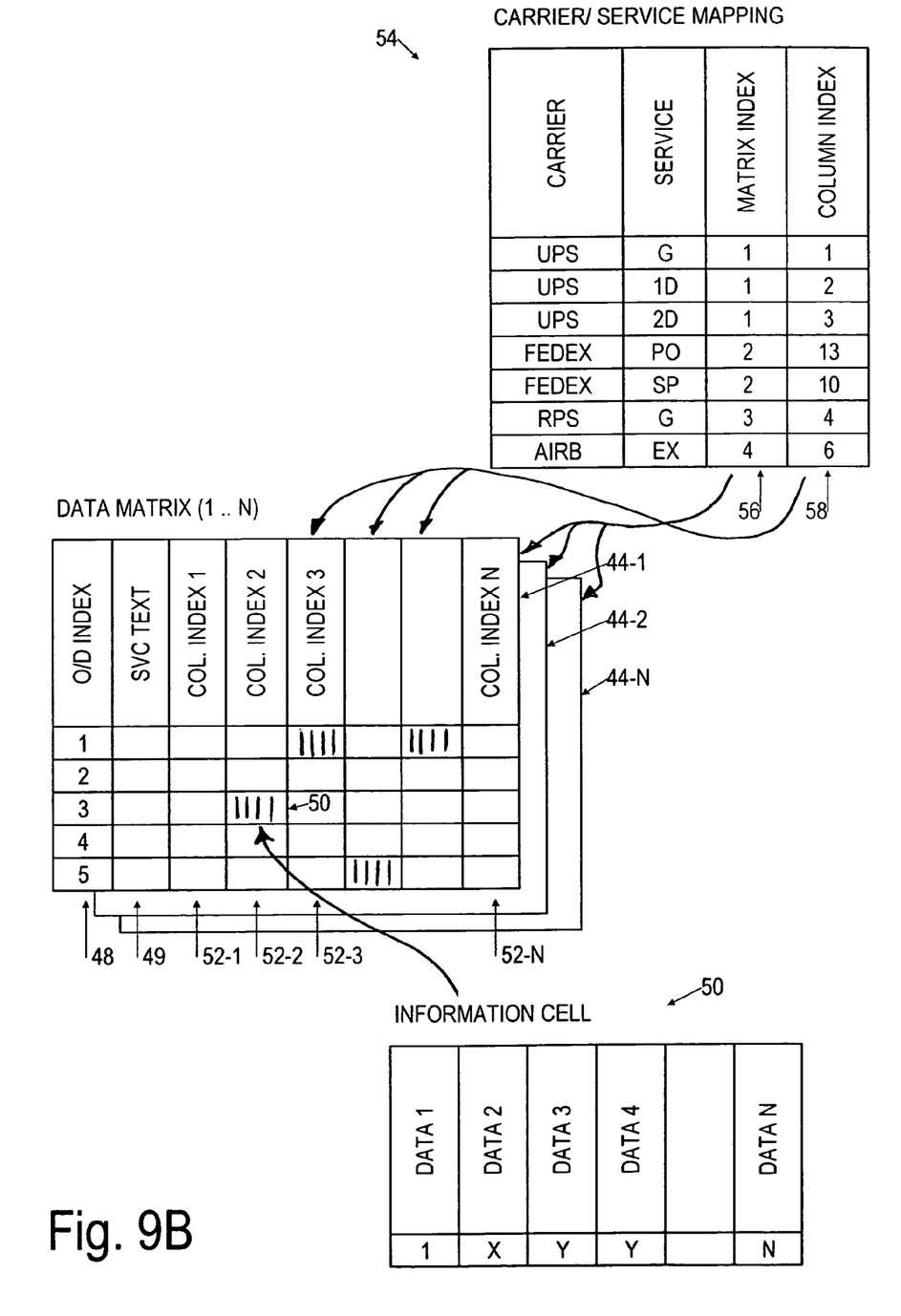

FIGS. 9A–9B form an illustration of the resolution of carrier specific data using a generic data model similar to that shown in FIGS. 5A–5B. This generic data model provides a solution to the business problem of retrieving shipment related data which is dependent on global origin/destination information, along with the specific carrier and service desired. This data model addresses the need for providing functionality in a reasonably small data footprint. Similar to FIGS. 5A–5B, this data model contains an origin map 32, 1 to N destination maps 34-1 through 34-N, as well as a carrier/service map 54 and one or more destination commitment matrices 44-1 through 44-N (shown in both FIGS. 9A and 9B). The data matrices contain the desired shipment information.

The carrier and service are first resolved into one or more indexes.

The specific carrier and the specific service resolves to one or more index(es) in the carrier/service mapping table 54. The first of the indices, the matrix index 56 specifies which data matrix 44-1 through 44-N to reference. The next index, the Column Index 58, specifies which column within the selected data matrix to use.

By using the origin/destination index as sent from the specified ZIP code areas of the specified Destination Map, the matrix index and the column index, a user is able to retrieve the desired information cell 50 as shown in FIG. 9B. The format of the information cell as seen in FIG. 9B contains a plurality of data values (Data 1 through Data N) which are designed for the particular implementation paradigm. Two such implementations are the use of delivery commitment information and presenting routing details for a package.

If this data model is read only, the data can be accessed by multiple processes on a simultaneous basis without the need to implement mutual exclusion or serialization of access. This design facilitates itself to being fully re-entrant and interruptable, making it suitable for use in client/server environments such as Internet-based rating and shipment planning, where multiple processors and processes may be acting on the data simultaneously.

To minimize size, both the Origin Map 32 and Destination Maps 34-1 through 34-N can be represented and accessed in a bit-wise manner. Where a byte consists of two four bit segments (FF hexadecimal), the origin/destination maps can be constructed so that each set of four bits (0–F hexadecimal) represents an origin or destination. This bit-wise construct can be extended to full bytes or more than full bytes or compressed to nibble (4 bit) form, depending upon the domain of the origin/destination data. In addition, all or portions of the data matrix 44-1 through 44-N, including the information cell 50, can be constructed in a bit-wise manner, depending on the domain of the data.

Delivery Commitment Resolution-Time Clock Transaction Processing

Various parameters can be used to determine the time-in-transit of a package, including parameters concerning the origin, destination, and carrier/service selected. Outputs can therefore include a notation indicating if the service commitment is guaranteed, if Saturday delivery is available, if Saturday is guarantee, etc. In particular, the shipping system can include a computer system clock 180 (FIG. 1) to determine the time of processing. The elapsed time from the transaction processing to the availability for carrier pick-up can be maintained in a file, as well as pick-up cut-off times determined by carrier/service. The result is more accurate time-in-transit data outputs which facilitate accurate freight bill audits and claims for transactions consummated with the selected carrier/service. In addition, enhanced carrier/service selection based on actual vs. estimated ability of a range of carrier/services to meet needed delivery targets can be determined.

In addition, when a carrier/service is selected based on price shopping, service shopping, or a combination of these parameters, sometimes referred to a "value shopping", the shipping system can include a configurable facility to automatically, or in response to user input, tender the available load to the selected carrier. In this way the selected carrier can either accept the load tendered, at which time it would return a receipt of the tender offered together with a unique identifier for tracking purposes, or not accept the load tendered. Furthermore the carrier can transmit its target or guarantee pick-up time to the user. This enables the customer to track performance, including factors such as on-time, delayed and missed pickups for purposes of determining the desirability of use of a particular carrier, as well as possibly for claims to be made with that carrier.

Should a carrier's pickup time be beyond that of its cut-off time as used in the determination of that carrier's selection, the user can be alerted and presented with the opportunity to confirm the carrier/service selection or to select an alternative carrier/service. Should an alternative carrier/service be selected, the system can automatically tender the load, and on receipt of an affirmative response from the alternative carrier, the user has the ability to send a cancellation message to the prior carrier/service selected. These modifications to the shipping system thus represent an extension to the shipping system disclosed above and augment its capabilities for the reasons set forth.

Thus what has been described is a system and method for determining carrier specific commitment data as well as modification of a shipping system for use of delivery commitment resolution. The data file structure may include information regarding the origin of the sender, the destination origin, the time in transit, the guaranteed delivery within a specified number of days, and the guaranteed delivery within a specified time of day. Based upon these parameters and associated file structures, the determination of a specific carrier and an associated service by that carrier, can be readily determined in view of the parameters set forth by the user.

Thus what has been described is a new and useful delivery commitment system and method for a network based shipping system and method. It is apparent to those skilled in the art that numerous modifications and departures from the specific embodiments described herein can be made without departing from the spirit and scope of the claimed invention.

What is claimed is:

1. A method for selecting a carrier for shipment of a package from an origin to a destination based on carrier specific delivery commitment information using a server, the method comprising:
   selecting, using a server, a service level supported by the carrier for delivery of the package from the origin to the destination,
   selecting, using a server, a class of service for delivery of the package,
   based upon the selected class of service for the package, using the server to determine a service column index value,
   based upon the service level supported by the carrier for delivery of the package from the origin to the destination and the determined service column index value, locating, using the server, a specific cell in a delivery commitment matrix comprised of a plurality of cells stored in the server, wherein each cell contains delivery commitment information for that carrier for the selected service level and selected class of service,
   reading, using the server, said delivery commitment information for that carrier from the specific cell,
   selecting the carrier for shipment of the package, using the server, if the delivery commitment information for that carrier from the specific cell corresponds to a desired delivery commitment for shipment of the package,
   verifying, using the server, said delivery commitment information relative to a real time clock to produce verified delivery commitment information,
   if said verified delivery commitment information is at a time later than a predetermined cut-off time, posting a notification of said later time, and
   determining whether or not said selected carrier and/or said selected service level is to be maintained or whether an alternative carrier and/or alternative service level is to be selected.

2. The method of claim 1, wherein the service column index value and class of service are maintained in a token map.

3. The method of claim 2, wherein service levels supported by a carrier are maintained in a destination map, wherein for each destination supported by the carrier, information is stored in a location of the destination map related to the service level supported by the carrier for that destination.

4. The method of claim 3, wherein the destination map has a location for each postal ZIP code and wherein a code is stored in the location for each postal ZIP code.

5. The method of claim 4, wherein a null code is stored in each destination map postal ZIP code location which is not supported by the carrier.

6. A system for selecting a carrier for shipment of a package from an origin to a destination based on carrier specific commitment data comprising:
   a server;
   a plurality of software components stored in the server, the plurality of software components comprising:
      means for causing the server to select a service level supported by the carrier for delivery of the package from the origin to the destination,
      means for causing the server to select a class of service for delivery of the package,
      means for causing the server to determine a service column index value based upon the selected class of service for the package,
      means, based upon the service level supported by the carrier for delivery of the package from the origin to the destination and the determined service column index value, for causing the server to locate a specific cell in a delivery commitment matrix comprised of a plurality of cells stored in the server, wherein each cell contains delivery commitment information for that carrier for the selected service level and selected class of service,
      means for causing the server to read said delivery commitment information for that carrier from the specific cell,
      means for causing the server to select the carrier for shipment of the package if the delivery commitment information for that carrier from the specific cell corresponds to a desired delivery commitment for shipment of the package,
      means for causing the server to verify said delivery commitment information to produce verified delivery commitment information using a real time clock, and
      means for causing the server to provide a notification of said later time and determining whether or not said selected carrier and/or said selected service level is to be maintained or whether an alternative carrier and/or alternative service level is to be selected if said verified delivery commitment information is at a time later than a pre-determined cut-off time.

7. The system of claim 6, wherein the service column index value and class of service are maintained in a token map.

8. The system of claim 7, wherein service levels supported by a carrier are maintained in a destination map, wherein for each destination supported by the carrier, information is stored in a location of the destination map related to the service level supported by the carrier for that destination.

9. The system of claim 8, wherein the destination map has a location for each postal ZIP code and wherein a code is stored in the location for each postal ZIP code.

10. The system of claim 9, wherein a null code is stored in each destination map postal ZIP code location which is not supported by the carrier.

* * * * *